United States Patent [19]

Rowe et al.

[11] Patent Number: 4,974,407
[45] Date of Patent: Dec. 4, 1990

[54] FOLDABLE HAY RAKE

[76] Inventors: Carroll G. Rowe, Rte. 3, Box 122 A1, Hope, Ark. 71801; John D. Little, Rte. 1, Box 165, Fulton, Ark. 71838

[21] Appl. No.: 487,353

[22] Filed: Mar. 2, 1990

Related U.S. Application Data

[63] Continuation-in-part of Ser. No. 433,807, Nov. 9, 1989, which is a continuation-in-part of Ser. No. 388,434, Aug. 2, 1989, abandoned.

[51] Int. Cl.$^5$ ............................................. A01D 78/14
[52] U.S. Cl. ...................................... 56/377; 56/15.9; 56/384; 56/DIG. 14
[58] Field of Search ...................... 56/377, 14.9, 15.9, 56/16.1, 16.3, 367, 350, 378, 379, 341, 384, DIG. 10, DIG. 14, DIG. 21

[56] References Cited

U.S. PATENT DOCUMENTS

| | | |
|---|---|---|
| 3,484,803 | 1/1968 | Breed et al. . |
| 3,834,142 | 9/1974 | Johnston et al. . |
| 3,936,994 | 2/1976 | Mortier et al. . |
| 3,995,416 | 12/1976 | van der Lely . |
| 4,034,623 | 7/1977 | Boone et al. . |
| 4,043,099 | 8/1977 | Cheatum . |
| 4,058,958 | 11/1977 | Sadler et al. . |
| 4,077,189 | 3/1978 | Hering . |
| 4,214,428 | 7/1980 | Caraway . |
| 4,457,127 | 7/1984 | Maier et al. . |
| 4,555,897 | 12/1985 | Degelman . |
| 4,621,487 | 11/1986 | Urlacher et al. . |
| 4,622,806 | 11/1986 | Bahman et al. . |
| 4,682,462 | 7/1987 | Johnson, Sr. . |
| 4,685,282 | 8/1987 | Allen . |
| 4,723,401 | 2/1988 | Webster et al. . |
| 4,723,402 | 2/1988 | Webster et al. . |
| 4,753,063 | 6/1988 | Buck ...................................... 56/370 |

Primary Examiner—Ramon S. Britts
Assistant Examiner—Terry Lee Melius
Attorney, Agent, or Firm—Fulbright & Jaworski

[57] ABSTRACT

A hay rake having a frame assembly, having a front, a back and two sides and supported by wheels for being moved by a vehicle. A first and second set of a plurality of fingerwheel rakes are provided with each set rotatably carried adjacent opposite sides of the frame about a separate axis. Each of the axis are at an angle to vertical and horizontal. A power actuator on the frame rotates the rakes about the axis for rotating the rakes downwardly, outwardly and backwardly for moving the rakes to a rake position and rotates the rakes upwardly, inwardly and forwardly to raise the rakes to a transport position.

9 Claims, 4 Drawing Sheets

FOLDABLE HAY RAKE

CROSS-REFERENCE TO RELATED APPLICATIONS

This applications is a continuation-in-part of U.S. patent application Ser. No. 07/433,807, filed Nov. 9, 1989, which in turn is a continuation-in-part of U.S. patent application Ser. No. 07/388,434, filed Aug. 2, 1989, entitled "Foldable Hay Rake" now abondoned.

BACKGROUND OF THE INVENTION

It is known as disclosed in U.S. Pat. Nos. 4,214,428; 3,484,803; and 3,995,416 to fold hay rakes from a downwardly operational hay raking position to an upward transport position for moving the hay rake to a different location.

The present invention is directed to an improved foldable hay rake in which the fingerwheel hay rakes are supported and operated in such a manner that the rakes may be easily moved by the operator from a hay raking position to a convenient transport position. The advantage of this invention is that the operator does not have to get off of the tractor in changing from a working to a transport position. Also, when the rake wheels are positioned in the transport position, the rake wheels are in a compact horizontal configuration requiring minimal width. The present invention also improves the efficiency of the hay rake as it enables it to make windrows around curves, follows the contour of the ground better, and all but eliminates the side thrust against the rake wheels and sharp turns without raising the rake.

SUMMARY

The present invention is generally directed to a hay rake which is movable between a rake position and a transport position which includes a frame assembly having a front and a back and supported by wheels for being moved by a vehicle. A plurality of fingerwheel rakes are rotatably carried by the frame about an axis and said plurality of rakes are supported by at least one support arm and the support arm arm is at an angle to the axis. Power means on the frame rotate the rakes about the axis for rotating the rakes downwardly, outwardly and backwardly, for moving the rakes to a rake position and for rotating the rakes upwardly, inwardly and forwardly to raise the rakes to a transport position.

Yet another object of the present invention is wherein the axis is directed towards the front at an angle downwardly and an angle outwardly for placing the fingerwheel rakes in the desired raking and transport position.

Still a further object of the present invention wherein the rake includes an upside down T shaped rake support rotatably connected to the axis and the support is in a plane which is at an angle to the axis. The support carries a conventional fingerwheel rake assembly. Preferably, the plane of the rake support is generally parallel to the rear of the frame when the rake is in the rake position.

A further object of the invention is a provision of a hay rake having a frame with a front, back and two sides and a first and second set of a plurality of fingerwheel rakes. Each set is rotatably carried adjacent to opposite sides of the frame about a separate axis. Both of the axis are at an angle to the vertical and to the horizontal. Power means on the frame rotate the rakes about the axis for rotating them between a rake position and an transport position.

Still a further object is wherein the power means includes a tubular member rotatable about each axis and a piston and cylinder assembly connected to each tubular member for rotating the tubular member about the axis.

Yet a still further object is wherein each axis is directed towards the front at an angle downwardly from the horizontal and at an angle outwardly from the vertical. In one embodiment, each axis is directed downwardly at an angle of approximately 30 degrees from the horizontal and at an angle outwardly of approximately 30 degrees from the vertical.

A still further object of the present invention is the provision of an upside T shaped rake support connected to each axis in which each support is in a plane which is at an angle to its connected axis.

Yet a still further object of the present invention is the provision of a rake support connected to each axis. Each support is in a plane which is at an angle to its connected axis and the support is in a plane which is generally parallel to the rear of the frame when the rake is in the rake position.

Other features and advantages will be apparent from the following description of a presently preferred embodiment of the invention, given for the purpose of disclosure, and taken in conjunction with the accompanying drawings.

DESCRIPTION OF THE PREFERRED EMBODIMENT

Figure 1:
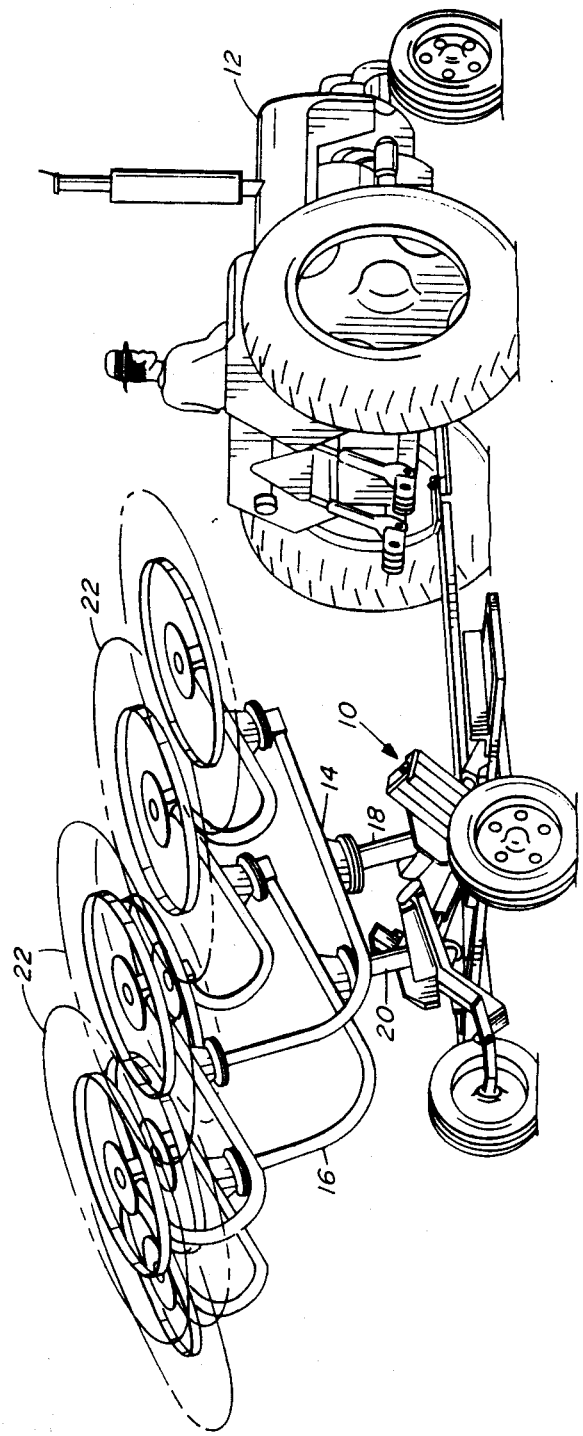
FIG. 1 is an elevational prospective view of the hay rake of the present invention in a transport position for being moved to other locations.
Figure 2:
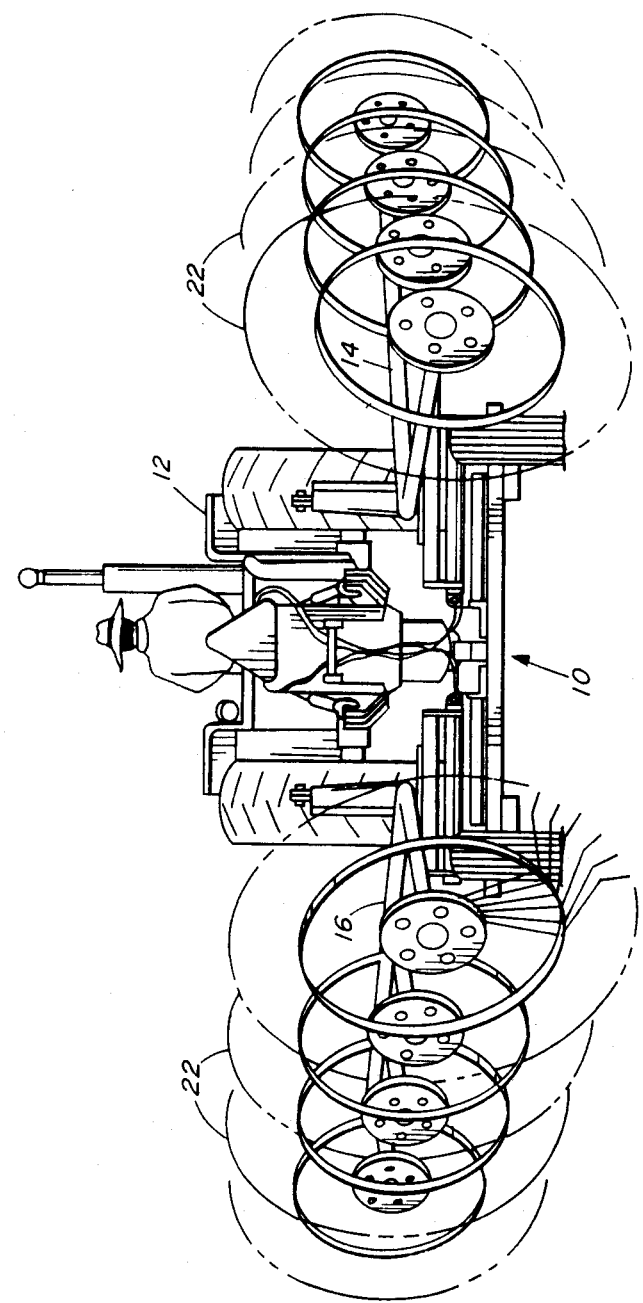
FIG. 2 is an elevational view of the hay rake of FIG. 1 in a rake operating position.

Referring now to the drawings, the reference numeral 10 generally indicates the retractable hay rake of the present invention best seen in FIGS. 1 and 2 as being towed by a conventional tractor 12. The hay rake 10 includes a plurality of wheel-type hay rakes here shown as the V-type fingerwheel hay rakes 14 and 16, each of which normally includes four or more rake wheels 22 and each set of which is supported from a main support arm 18 and 20, respectively. The rakes may be a conventional fingerwheel hay rake such as an eight wheel model sold by Settrex. Of course, other and different types of fingerwheel hay rakes may be utilized.

In FIG. 1, the main support arms 18 and 20 have been pivoted upwardly, inwardly, and forwardly to raise the wheel rakes 22 to a transport position, for conveniently moving the hay rake 10 to a desired location. In FIG. 1, the sets 14 and 16 of the wheel frames are rotated inwardly until they are generally parallel and in a generally vertical position, thus permitting the alignment of the rake wheels 22 in a flat, generally horizontally overlapping position, thus minimizing the retracted width, minimizing the height at the front, while providing ground clearance at the rear of the rake 10.

In FIG. 2, the arms 18 and 20 have been rotated downwardly, outwardly and backwardly to move the plurality of wheel rakes 22 to a downward and hayraking position.

Figure 3:
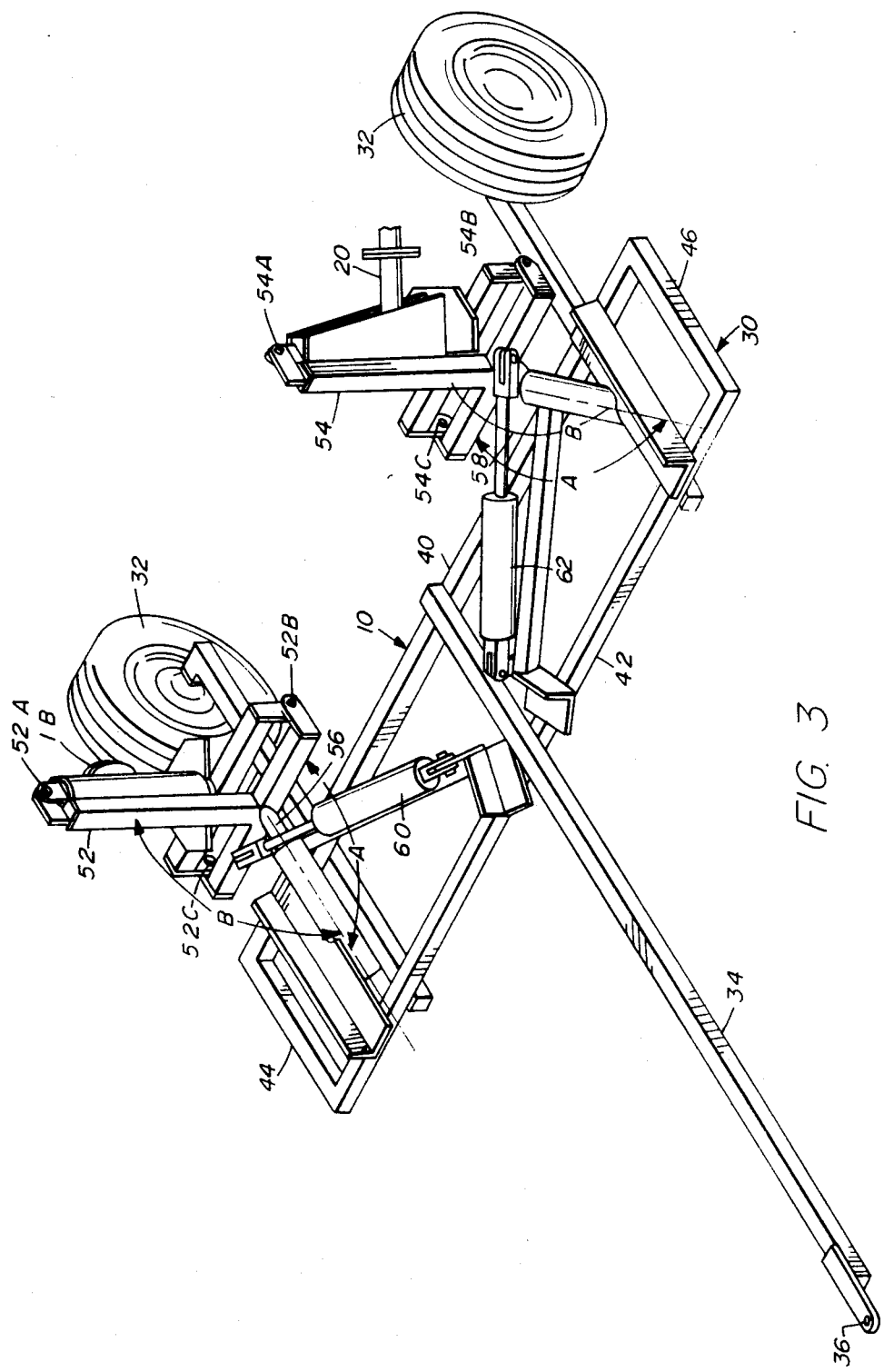
FIG. 3 is an enlarged fragmentary prospective view showing the operating mechanism of FIGS. 1 and 2 in a hayraking position with the fingerwheel rake assemblies removed for clarity.
Figure 4:
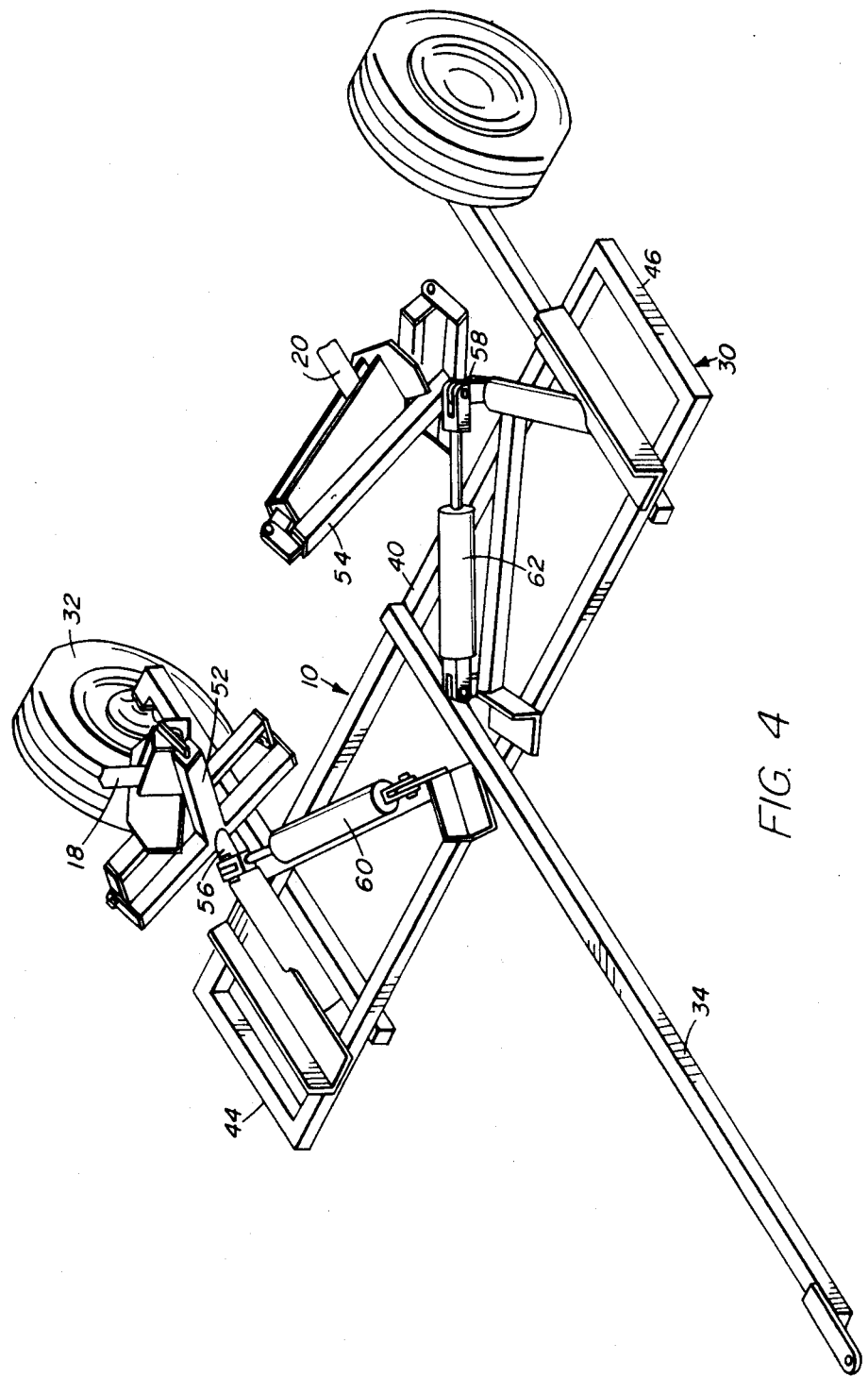
FIG. 4 is a view similar to FIG. 3 with the operating mechanism in the transport position.

Referring to FIGS. 3 and 4, the hay rake 10 includes a frame assembly generally indicated by the reference 30 which is preferably in a horizontal plane, and which is supported by wheels 32. The frame 30 includes a hitch 34 having a suitable connection 36 for attachment to a towing vehicle such as the tractor 12. The frame 30 includes a back 40, a front 42, and first and second sides 44 and 46.

Each of the sets 14 and 16 of the plurality of fingerwheel rakes 22 which are supported from main support arms 18 and 20, respectively, are carried adjacent the opposite sides 44 and 46, respectively, for rotation about a separate axis 48 and 50, respectively. Preferably each of the main support arms 18 and 20 are connected to and rotated about the axis 48 and 50, repectively, through a rake support 52 and 54, respectively. The main support arms 18 and 20 are supported at an angle to the axis 48 and 50, respectively, so that when they are rotated about their coacting axis they will rotate their respective sets of fingerwheel rakes 22 downwardly, outwardly and backwardly for moving the rakes to a rake position and when rotated oppositely will rotate the rakes upwardly, inwardly and forwardly to raise the rakes to a transport position. A tubular member 56 and 58 is rotatable about the axis 48 and 50, respectively, and power means such as hydraulic piston and cylinder assemblies 60 and 62 are connected to the tubular members 56 and 58 for rotating them about their respective axis.

Preferably, the rake supports 52 and 54 are upsidedown T shaped rake supports having connecting points 52A, 52B and 52C and 54A, 54B and 54C at their ends providing hitch points for the attachment of conventional fingerwheel hay rake assemblies.

In order to rotate the fingerwheel rakes between a rake position and a transport position, the axis 48 and 50 are directed from the back 40 towards the front 42 at an angle downwardly from the horizontal and at an angle outwardly from vertical. In the preferred embodiment, the downwardly directed angle from the horizontal of the axis 48 and 50 is approximately 30 degrees and the angle outwardly from the vertical is also approximately 30 degrees. It is to be noted that the axis 48 and 50 are not parallel as in the embodiments of our prior co-pending patent applications. Preferably, the inverted T shaped rake supports 52 and 54, in a rake position, as best seen in FIG. 3, are generally in a plane parallel to the rear 40 of the frame 30. In the preferred embodiment the rake supports 52 and 54 are rotated approximately 90 degrees, as best seen in FIG. 4, to raise the fingerwheel rakes to the transport position of FIG. 1. Therefore, the upsidedown T shaped rake supports 52 and 54 are in a plane which is at a horizontal angle A to the axis 48 and 50, respectively, in a plane which is at a vertical angle B. That is, the axis 48 and 50 are directed downwardly from the vertical plane of the supports 52 and 54 at an angle B of 120 degrees and outwardly in a horizontal direction at an angle B of 120 degrees.

The angles are for illustration only and may be changed to change the angle of tilt of the rakes forward inn the transport position.

When it is desired to operate the rakes 14 and 16, the hydraulic piston and cylinder assemblies 60 and 62 are actuated to rotate the tubular members 56 and 58 about the axis 48 and 50, respectively. Rotation of the supports 52 and 54 will cause rotation of the arms 18 and 20 and in turn the fingerwheel hay rakes 14 and 16 between a rake position and a transport position.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts, will be readily apparent to those skilled in the art and which are encompassed within the spirit of the invention and the scope of the appended claims.

What is claimed is:

1. A hay rake movable between a rake position and a transport position comprising,
    a frame assembly having a front and a back supported by wheels for being moved by a vehicle,
    a plurality of fingerwheel rakes rotatably carried by the frame about an axis, said plurality of rakes supported by at least one support arm, said support arm being at an angle to the axis,
    power means on the frame for rotating the rakes about the axis for rotating the rakes downwardly, outwardly and backwardly for moving the rakes to a rake position, and rotating the rakes upwardly, inwardly and forwardly to raise the rakes to a transport position, and
    an upside down T-shaped rake support rotatably connected to the axis, said support being in a plane which is at an angle to the axis.

2. The apparatus of claim 1 wherein the plane is generally parallel to the rear of the frame when the rake is in the rake position.

3. A hay rake movable between a rake position and a transport position comprising,
    a frame assembly having a front, a back and two sides and supported wheels for being moved by a vehicle,
    a first and second set of a plurality of fingerwheel rakes, each set rotatably carried adjacent opposite sides of the frame about a separate axis, said separate axis being non-parallel to each other and both of said axis being at an angle to vertical and to horizontal, and
    power means on the frame for rotating the rakes about the axis for rotating the rakes downwardly, outwardly and backwardly for moving the rakes to a rake position and rotating the rakes upwardly, inwardly and forwardly to raise the rakes to a transport position.

4. The apparatus of claim 3 wherein the power means includes,
    a tubular member rotatable about each axis, and
    a piston and cylinder asssembly connected to each tubular member for rotating the tubular member about the axis.

5. The apparatus of claim 3 wherein each axis is directed toward the front at an angle downwardly from horizontal and at an angle outwardly from vertical.

6. The apparatus of claim 5 wherein each axis is directed downwardly at an angle of approximately thirty degrees from the horizontal and at an angle outwardly of approximately thirty degrees from the vertical.

7. The apparatus of claim 5 including,
    a rake support rotatably connected to each axis, each support being in a plane which is at an angle to its connected axis.

8. The apparatus of claim 3 including,
an upside down T-shaped rake support connected to each axis, each support having a plane which is at an angle to its connected axis.
9. The apparatus of claim 3 including,
a rake support connected to each axis, each support being in a plane which is at an angle to its connected axis, said support being in a plane which is generally parallel to the rear of the frame when the rake is in the rake position.

* * * * *

REEXAMINATION CERTIFICATE (2206th)
United States Patent [19]
Rowe et al.

[11] B1 4,974,407
[45] Certificate Issued  Jan. 25, 1994

[54] FOLDABLE HAY RAKE

[76] Inventors: Carroll G. Rowe, Rte. 3, Box 122 A1, Hope, Ark. 71801; John D. Little, Rte. 1, Box 165, Fulton, Ark. 71838

Reexamination Request:
No. 90/002,905, Dec. 11, 1992

Reexamination Certificate for:
Patent No.: 4,974,407
Issued:    Dec. 4, 1990
Appl. No.: 487,353
Filed:     Mar. 2, 1990

Related U.S. Application Data

[63] Continuation-in-part of Ser. No. 433,807, Nov. 9, 1989, which is a continuation-in-part of Ser. No. 388,434, Aug. 2, 1989, abandoned.

[51] Int. Cl.$^5$ ............................................. A01D 78/14
[52] U.S. Cl. ...................................... 56/377; 56/15.9; 56/384; 56/DIG. 14
[58] Field of Search ................... 56/377, 14.9, 15.9, 56/16.1, 16.3, 367, 350, 378, 379, 341, 384, DIG. 10, DIG. 14, DIG. 21

[56] References Cited

U.S. PATENT DOCUMENTS

| Number | Date | Inventor | Class |
|---|---|---|---|
| 3,208,536 | 9/1965 | Orendorff | 172/456 |
| 3,498,387 | 3/1970 | Roth | 172/456 |
| 3,814,191 | 6/1974 | Tilbury | 172/311 |
| 4,011,914 | 3/1977 | Elmer | 172/126 |
| 4,049,062 | 9/1977 | Rossmiller et al. | 172/126 |
| 4,171,726 | 10/1979 | Ward | 172/456 |
| 4,172,537 | 10/1979 | Gandrud et al. | 222/135 |
| 4,366,867 | 1/1983 | Filbrun | 172/776 |
| 4,529,040 | 7/1985 | Grollimund | 172/311 |
| 4,996,833 | 3/1991 | Von Allowerden | 56/385 X |

FOREIGN PATENT DOCUMENTS

| Number | Date | Country |
|---|---|---|
| 2455660 | 7/1975 | Fed. Rep. of Germany |
| 2406702 | 8/1975 | Fed. Rep. of Germany |
| 2414098 | 10/1975 | Fed. Rep. of Germany |
| 2818359 | 11/1979 | Fed. Rep. of Germany |

*Primary Examiner*—Terry Lee Melius

[57] ABSTRACT

A hay rake having a frame assembly, having a front, a back and two sides and supported by wheels for being moved by a vehicle. A first and second set of a plurality of fingerwheel rakes are provided with each set rotatably carried adjacent opposite sides of the frame about a separate axis. Each of the axis are at an angle to vertical and horizontal. A power actuator on the frame rotates the rakes about the axis for rotating the rakes downwardly, outwardly and backwardly for moving the rakes to a rake position and rotates the rakes upwardly, inwardly and forwardly to raise the rakes to a transport position.

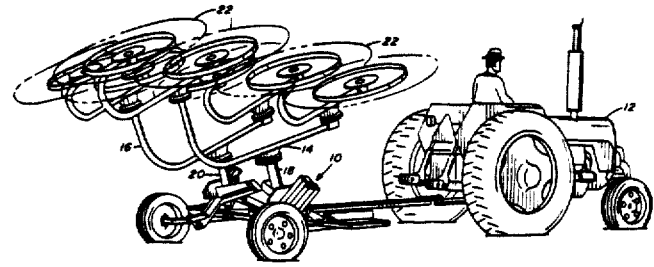

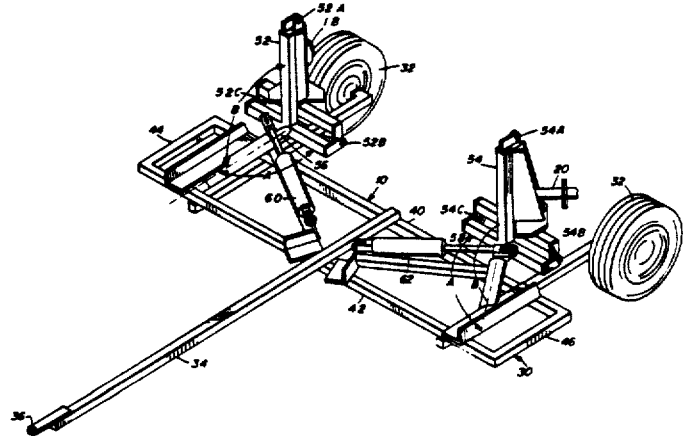

B1 4,974,407

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 2 is confirmed.

Claims 3 and 4 are cancelled.

Claims 5, 8 and 9 are determined to be patentable as amended.

Claims 6 and 7, dependent on an amended claim, are determined to be patentable.

New claims 10, 11, 12, 13 and 14 are added and determined to be patentable.

5. [The apparatus of claim 3 wherein] *A hay rake movable between a rake position and a transport position comprising,*

*a frame assembly having a front, a back and two sides and support wheels for being moved by a vehicle,*

*a first and second set of a plurality of fingerwheel rakes, each set rotatably carried adjacent opposite sides of the frame about a separate axis, said separate axes being non-parallel to each other and both of said axes being at an angle to vertical and to horizontal,*

*power means on the frame for rotating the rakes about the axis for rotating the rakes downwardly, outwardly and backwardly for moving the rakes to a rake position and rotating the rakes upwardly, inwardly and forwardly to raise the rakes to a transport position, and* each axis is directed toward the front at an angle downwardly from horizontal and at an angle outwardly from vertical.

8. The apparatus of claim [3] *5* including,
an upside down T-shaped rake support connected to each axis, each support having a plane which is at an angle to its connected axis.

9. The apparatus of claim [3] *5* including,
a rake support connected to each axis, each support being in a plane which is at an angle to its connected axis, said support being in a plane which is generally parallel to the rear of the frame when the rake is in the rake position.

*10. A hay rake movable between a rake position and a transport position comprising,*

*a frame assembly having a front, a back, and two sides and supported by wheels for being moved by a vehicle,*

*a first and second set of a plurality of fingerwheel rakes, each set rotatably carried adjacent opposite sides of the frame and about a separate axis, said separate axis being non-parallel to each other and both of said axis being at an angle to the vertical and to the horizontal, each said axis being directed towards the front at an angle downwardly from the horizontal and at an angle outwardly from the horizontal, said angles being substantially equal, and*

*power means on the frame for rotating the rakes about the axis for rotating the rake downwardly, outwardly and backwardly for moving the rakes to a rake position and rotating the rakes upwardly, inwardly and forwardly to raise the rakes to a transport position.*

*11. The apparatus of claim 10 wherein all the rakes are rotatable about one of the axis.*

*12. The apparatus of claim 10 wherein the axis are rotated approximately 90 degrees.*

*13. The apparatus of claim 11 wherein the power means rotates the rakes to an overhead substantially horizontal position.*

*14. The apparatus of claim 10 including,*

*a rake support rotatably connected to each axis, each support being in a plane which is at an angle to its connected axis, and a wheel rake support arm connected at an angle to each rake support.*

* * * * *